(No Model.) 2 Sheets—Sheet 1.

F. C. PATTEN.
HARROW.

No. 496,440. Patented May 2, 1893.

Witnesses:
Lew. C. Curtis
Mack A. Claflin

Inventor:
Frank C. Patten
By Munday, Evarts & Adcock
His Attorneys (No Model.) 2 Sheets—Sheet 2.
F. C. PATTEN.
HARROW.
No. 496,440. Patented May 2, 1893.
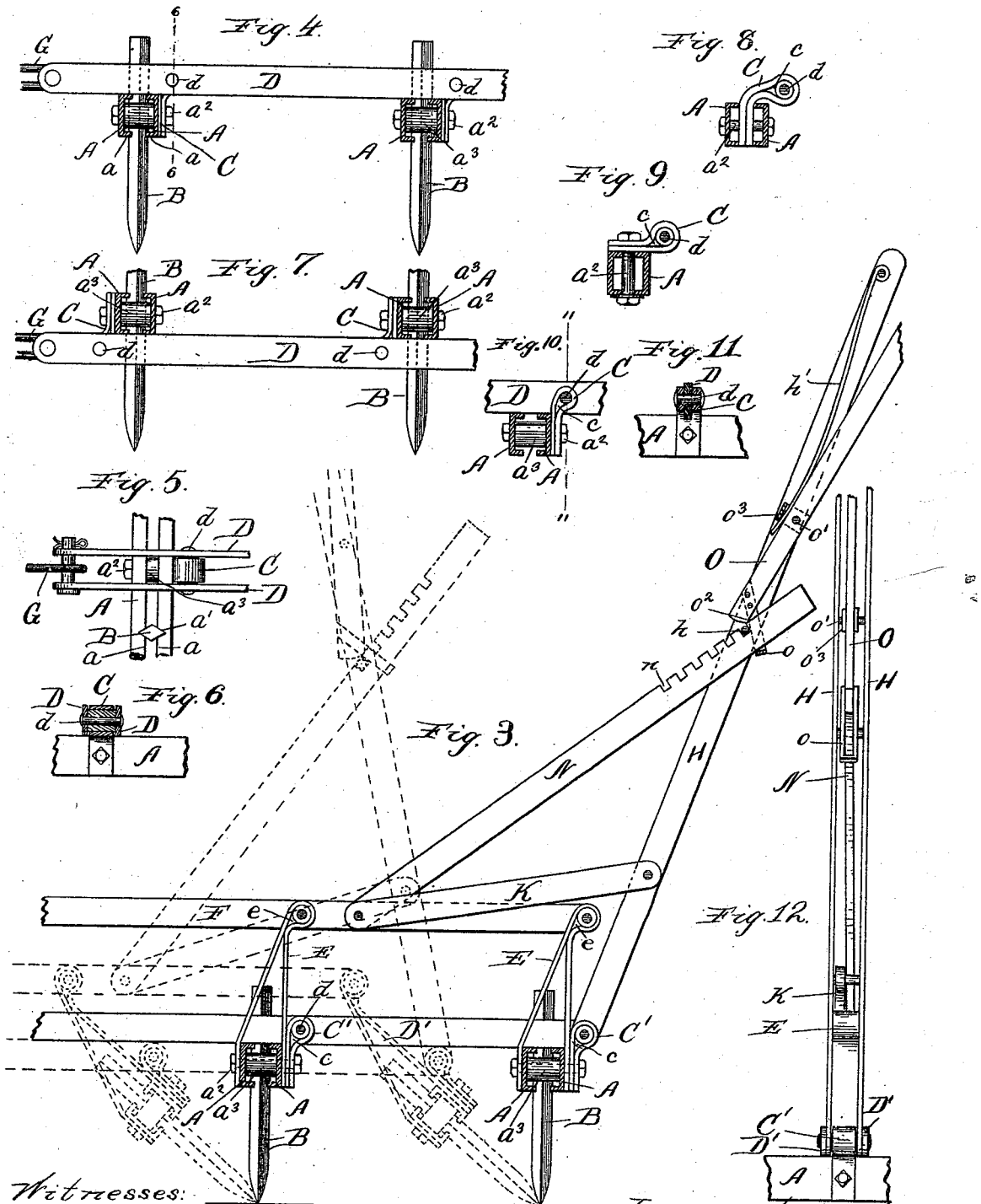
Witnesses:
Lew. C. Curtis
Mack A. Claflin
Inventor:
Frank C. Patten.
By Munday, Evarts & Adcock.
His Attorneys.

UNITED STATES PATENT OFFICE.

FRANK C. PATTEN, OF DE KALB, ILLINOIS, ASSIGNOR TO HIMSELF AND MADISON D. SHIPMAN, OF SAME PLACE.

HARROW.

SPECIFICATION forming part of Letters Patent No. 496,440, dated May 2, 1893.

Application filed November 26, 1888. Serial No. 291,858. (No model.)

*To all whom it may concern:*

Be it known that I, FRANK C. PATTEN, a citizen of the United States, residing in De Kalb, in the county of De Kalb and State of Illinois, have invented a new and useful Improvement in Harrows, of which the following is a specification.

My invention relates to harrows.

The object of my invention is to provide an efficient harrow of a simple and durable construction, having teeth mounted in rocking bars so that they may be set at any inclination desired or tilted for the purpose of cleaning, and provided with levers for operating the same.

My invention consists in the novel devices and novel combinations of parts and devices herein shown and described and more particularly pointed out in the claims.

Figure 1:
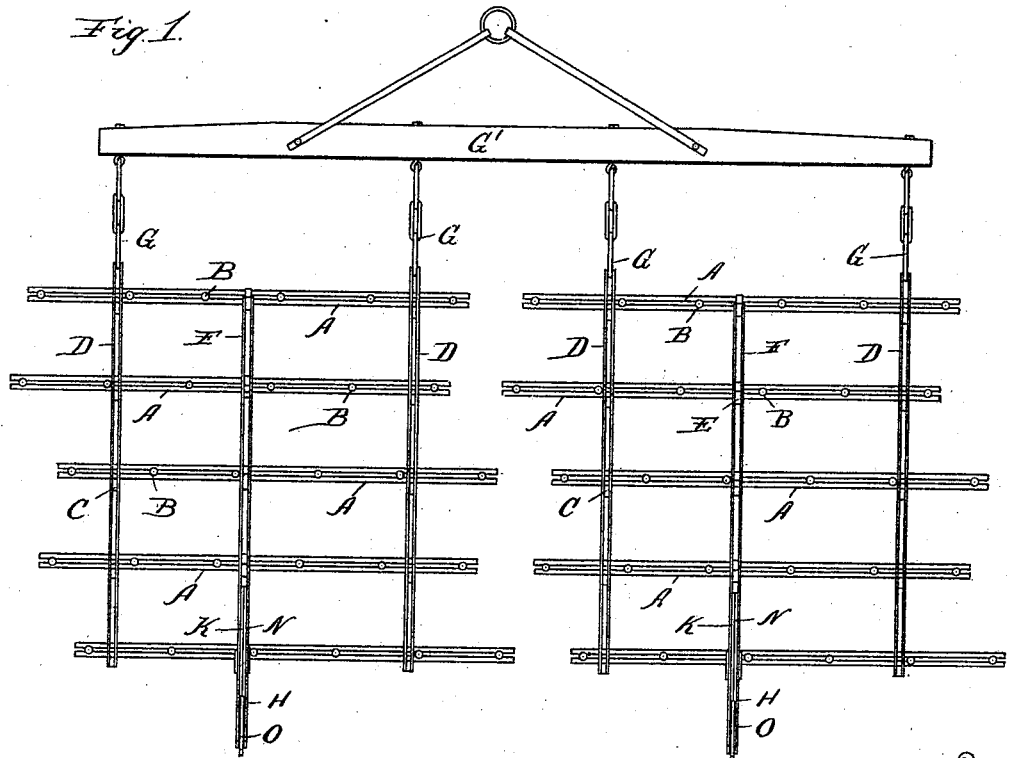
Figure 2:
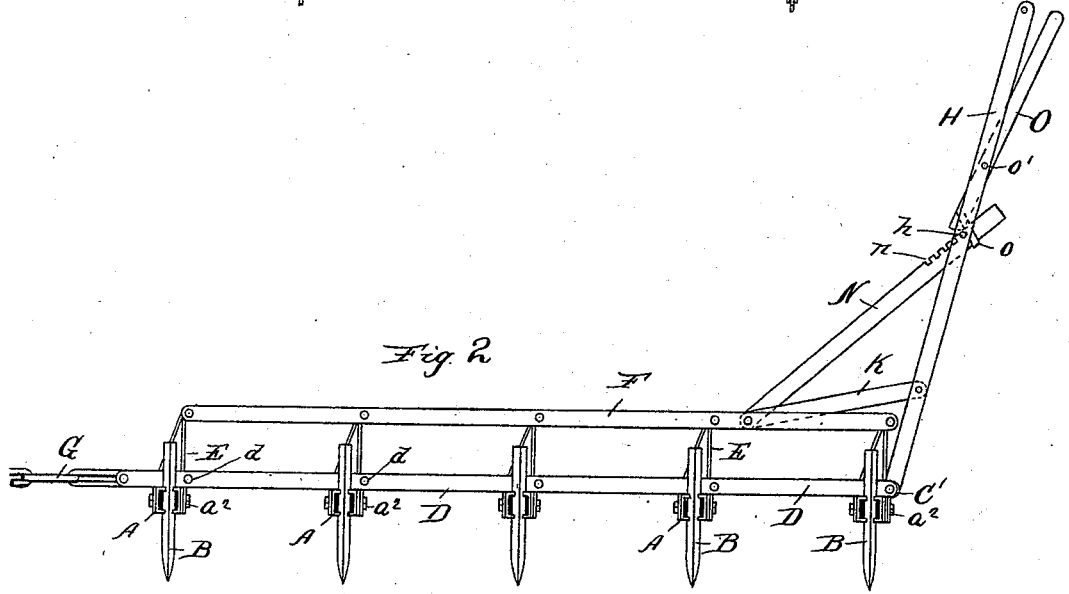

In the accompanying drawings, which form a part of this specification, and in which similar letters of reference indicate like parts Figure 1 is a plan view of a harrow embodying my invention. Fig. 2 is a side elevation. Fig. 3 is an enlarged partial sectional view showing the operating lever and locking devices in elevation. Fig. 4 is a section on line 4—4 of Fig. 1. Fig. 5 is a detail plan view showing the clip uniting the draw bars and teeth clamping channel bars. Fig. 6 is a section on line 6—6 of Fig. 4. Fig. 7 represents a modification wherein the draw bars are arranged below the teeth clamping channel bars. Figs. 8, 9 and 10 illustrate modified ways of combining the draw bars, clips and teeth clamping channel bars. Fig. 11 is a section on line 11—11 of Fig. 10. Fig. 12 is an edge view of the operating lever.

In said drawings A A represents the channel bars, in or between which the teeth B are clamped and held. The opposing flanges $a$ of the channel bars A are furnished with notches $a'$ in which the teeth B fit and by which they are firmly clamped. Each pair of channel bars A A are firmly clamped together so as to rigidly hold the teeth in place between them by means of threaded bolts $a^2$. The bolts $a^2$ pass through thimbles $a^3$ which serve to prevent the channel bars springing between the teeth under the action of the clamping bolts. Each tooth holding or carrying bar is thus composed of two plain channel bars, having simple notches cut in their opposing flanges for the reception of the teeth.

C C are the hinged clips by which each pair of teeth holding channel bars A A are hinged or united to the draw bars D D.

Each pair of draw bars D consists of two plain bars secured together parallel to each other by bolts or rivets $d$. The eye $c$ of the clip C fits between the bars D D, and is pivoted upon the bolt or rivet $d$.

The clip C consists simply of a strap of wrought iron folded upon itself to form the eye $c$ near its middle, and it is secured to the pair of channel bars A A by means of the bolt $a^2$. Each pair of channel bars A A is thus independently hinged to the draw bar D D, so that the teeth may be inclined into any position desired, or tilted when required for cleaning. By constructing the teeth carrying bars in this manner, each consisting of two plain channel bars with simple notches for the reception of the teeth and clamping bolts, and by pivotally connecting such teeth carrying bars to the draw bars the teeth may not only be adjusted pivotally to incline them forward or backward but vertically to make their operative length longer or shorter as may be required for different kinds of work or to adapt the harrow for light soft soil fields filled with stalks or rubbish, or for sod or other fields.

The vertical adjustment of the teeth may be very readily effected by simply slightly loosening the clamping bolts $a^2$ and then driving the teeth up or down with a hammer, mallet or other suitable implement. The operative length of the teeth may also be further adjusted by placing the teeth clamping channel bars above the draw bars D, as shown in Fig. 7.

Each pair of teeth clamping channel bars A A is furnished with an operating lever arm clip E, consisting of a flat bar of wrought iron doubled upon itself to form an eye $e$, whereby the same is pivoted to the operating bar F. One branch of the clip E fits on one side of the double channel bar A and the other branch on the opposite side thereof. The two branches of the clip are thus inclined at an angle to each other so that they brace each other. The clip is secured to the double channel bar A A by the bolt $a^2$. By means of the clips E E all the teeth clamping bars A A are connected to the common operating bar F.

About midway between the draw bars D D, I provide, or prefer to provide, a cross or brace bar D', which is connected to the teeth bars A A by clips C'. The bars D' and the clips C' are similar in construction and operation to the bars D and clips C; the only difference in fact being that the bars D' are not extended and furnished with links G to connect with the front coupling bar G'.

The bar F is operated so as to tilt or incline the teeth by means of a lever H, consisting preferably of two parallel bars fitting astride of and pivoted to the clip C' at the rear end of the brace bar D'. The lever H is connected to the operating bar F by a connecting bar K.

The operating bar F is locked in any desired position by means of a locking bar or device N, having notches or teeth $n$ which engages a pin or projection $h$ on the lever H. The locking bar N is pivoted at its lower end to the operating bar F, and its upper end is supported by a strap or loop $o$ secured at the end of the gripping bar O. The gripping bar or lever O is pivoted at $o'$ to the operating lever H, and the heel or extremity $o^2$ of the gripping lever O serves to disengage or push the locking bar N off of the pin or projection $h$. The lever H is furnished with a spring $h'$ which passes through a guide loop $o^3$ on the gripping bar O, and serves to hold the locking bar N normally in engagement with the pin $h$ on the lever H.

In Fig. 7 the double channel bars A A are secured above the drag bars D. This modification gives an under drag to the harrow and is better adapted for some kinds of work. This modification requires no change in the construction of any of the parts, and consists simply in putting them together in a different way.

In Fig. 8 I have shown a modified method of securing the clips C to the channel bars A A. In this modification the ends of the clip fit and are clamped between the two channel bars.

In Fig. 9 the clip C is secured on the edge instead of the side of the double channel bar A A.

In Figs. 10 and 11 the clip C is secured to the side of the channel bar, but is furnished with a central slot in which fits a single instead of a double, draw bar D.

While certain features of my invention consist in the particular construction shown of the teeth carrying bars, and of the draw bars, I desire it to be understood that certain other features of my improvement may be employed in connection with teeth bars and draw bars of any well known or suitable construction and whether said bars are made of metal, wood or other material.

By my invention it will be readily understood, by those skilled in the art, that the teeth may be adjusted up or down in their clamping channel bars so as to make them longer or shorter and inclined backward or forward, and the draw bars adjusted above or below the teeth bars as may be required by the particular condition of the field in which it is being used. For example in harrowing a sod field, especially if the sod is very tough it will be found desirable to prevent the harrow from "jumping" or "jerking" to shorten or adjust the teeth upward; and some times for example in harrowing a fall plowed field that has become somewhat hardened by repeated rains it is necessary to do good work to adjust the teeth with a slight inclination forward to cause the teeth to draw deeper in the soil; and also it is necessary, as, for example, in harrowing a field of young corn to prevent injury to the young plants to incline the teeth somewhat backward and to lengthen or adjust them down. By thus making the teeth adjustable both as to length and inclination my harrow is adapted to operate perfectly under every condition, and as well for any particular use as harrows constructed and designed for that particular use alone.

I claim—

1. The harrow having draw bars adjustable above and below the teeth bars and the teeth bars pivotally connected to the draw bars whether the draw bars are adjusted above or below the teeth bars, and consisting in the combination of a series of teeth clamping channel bars A A furnished with teeth, draw bars D D, and reversible hinged clips C adapted to be secured to either side of the teeth clamping channel bars, and pivotally connected to said draw bars, substantially as specified.

2. The harrow having draw bars adjustable above and below the teeth bars and the teeth bars pivotally connected to the draw bars whether the draw bars are adjusted above or below the teeth bars, and consisting in the combination of a series of teeth clamping channel bars A A furnished with teeth, draw bars D D, and reversible hinged clips C adapted to be secured to either side of the teeth clamping channel bars, and pivotally connected to said draw bars, said clips C consisting each of a flat bar of metal folded upon itself to form an eye at one end of the clip and a flat shank at the opposite end of the clip adapted to be bolted securely to the teeth bar on either side thereof, substantially as specified.

3. The combination of the teeth carrying bars with the draw bars, a double operating bar, a double bar lever, and a connecting bar pivoted at one end to and between said double operating bars, and at the opposite end pivoted to and between the two bars forming the double bar lever, substantially as specified.

4. The combination of the teeth carrying bars with the draw bars, a double operating bar, a double bar lever, and a connecting bar pivoted at one end to and between said double operating bars, and at the opposite end pivoted to and between the two bars forming the double bar lever, and a locking bar N also fitting between and pivoted to the two bars of said lever and of said operating bar, substantially as specified.

5. The combination in a harrow of the teeth bars with the draw bars, operating lever H having pin $h$, and notched locking bar N, and a lever for supporting and moving said locking bar in and out of engagement with said pin $h$, substantially as specified.

6. The combination of the operating bar F, lever H having pin $h$, connecting bar K and locking bar N, and lever O having loop $o$, the heel or end of said lever engaging said locking bar, substantially as specified.

7. The combination of the operating bar F, lever H having pin $h$, connecting bar K, locking bar N and a gripping device for holding and supporting the free end of the locking bar in engagement with said pin $h$, substantially as specified.

8. The combination of the operating bar F, lever H, connecting bar K, locking bar N, gipping bar or lever O and spring $h'$, substantially as specified.

FRANK C. PATTEN.

Witnesses:
JOHN F. BERGQUIST,
CHARLES H. SALISBURY.